(12) United States Patent
Rosenfeld

(10) Patent No.: US 8,626,183 B2
(45) Date of Patent: Jan. 7, 2014

(54) POSITIONING METHOD AND APPARATUS

(75) Inventor: Josi Rosenfeld, London (GB)

(73) Assignee: Koninklijke Philips N.V., Eindhoven (NL)

( * ) Notice: Subject to any disclaimer, the term of this patent is extended or adjusted under 35 U.S.C. 154(b) by 1771 days.

(21) Appl. No.: 10/580,497

(22) PCT Filed: Nov. 26, 2004

(86) PCT No.: PCT/IB2004/052565
§ 371 (c)(1),
(2), (4) Date: May 23, 2006

(87) PCT Pub. No.: WO2005/052629
PCT Pub. Date: Jun. 9, 2005

(65) Prior Publication Data
US 2007/0184783 A1 Aug. 9, 2007

(30) Foreign Application Priority Data
Nov. 29, 2003 (GB) .................................. 0327794.4

(51) Int. Cl.
*H04W 24/00* (2009.01)
(52) U.S. Cl.
USPC .................... 455/456.1; 455/67.11

(58) Field of Classification Search
USPC .......... 455/456.1, 456.2, 456.3, 456.5, 456.6, 455/67.11, 404.2
See application file for complete search history.

(56) References Cited

U.S. PATENT DOCUMENTS

| 5,742,635 A * | 4/1998 | Sanderford, Jr. .............. 375/149 |
| 5,764,686 A | 6/1998 | Sanderford et al. |
| 6,031,490 A * | 2/2000 | Forssen et al. ................. 342/457 |
| 6,052,561 A * | 4/2000 | Rudowicz et al. ........... 455/13.1 |
| 6,266,534 B1 * | 7/2001 | Raith et al. .................. 455/456.3 |
| 6,876,859 B2 * | 4/2005 | Anderson et al. ........... 455/456.1 |
| 6,990,351 B2 * | 1/2006 | Tsunehara et al. .......... 455/456.1 |
| 7,006,834 B2 * | 2/2006 | Gaal et al. ................... 455/456.1 |
| 7,006,838 B2 * | 2/2006 | Diener et al. ............... 455/456.1 |
| 7,065,368 B2 * | 6/2006 | You et al. .................... 455/456.1 |
| 7,069,025 B2 * | 6/2006 | Goren et al. ................. 455/456.2 |
| 2002/0098852 A1 | 7/2002 | Goren et al. |
| 2002/0118723 A1 | 8/2002 | McCrady et al. |
| 2004/0137914 A1 * | 7/2004 | Turetzky et al. ............ 455/456.1 |
| 2005/0003828 A1 * | 1/2005 | Sugar et al. ................. 455/456.1 |
| 2005/0048923 A1 * | 3/2005 | Mohseni et al. ............. 455/67.11 |
| 2006/0153435 A1 * | 7/2006 | Wallmark et al. ............. 382/129 |

FOREIGN PATENT DOCUMENTS

EP 1061667 12/2000

* cited by examiner

Primary Examiner — Ping Hsieh

(57) ABSTRACT

In a GPS or GSM system using DSSS signals, accurate and robust time-of-flight signal processing is achieved by selection of leading-edge or correlation techniques based on a variety of tests and environmental conditions.

11 Claims, 2 Drawing Sheets

POSITIONING METHOD AND APPARATUS

Figure 1:
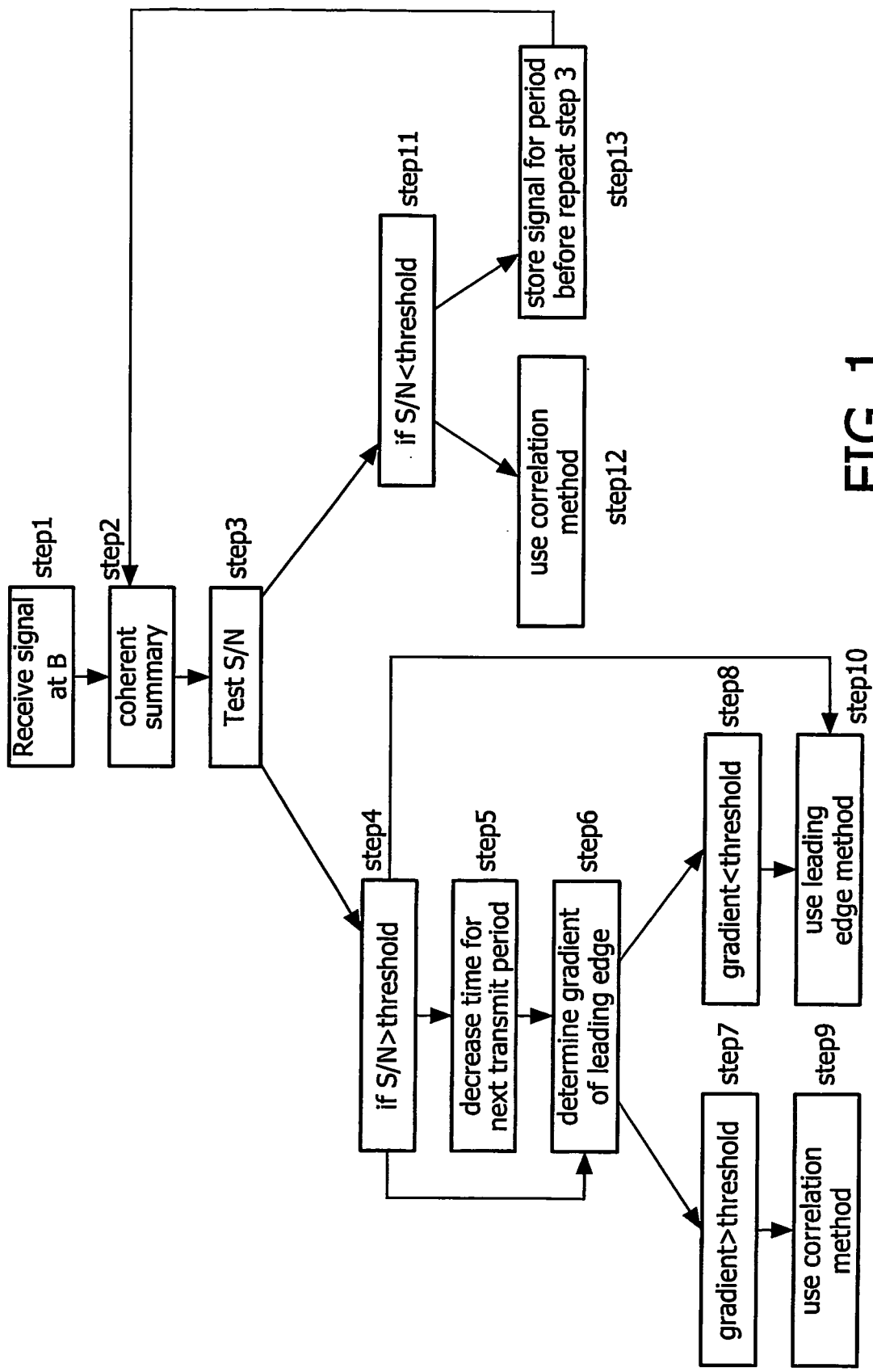

The present invention relates to a positioning method and apparatus.

Time-of-arrival radio location systems, for example as described in U.S. Pat. No. 5,764,686, utilise correlation techniques but these position processing methods are not well suited to densely populated environments with high levels of mult-path degradation.

It is an object of the present invention is to improve on the known art.

According to the present invention, there is provided a positioning method for a radio system, the method comprising:

receiving signals at a unit of the system;

applying at least one test on the received signals to select a processing operation on the signals, the operation being one of the following: a correlation processing operation, a leading edge processing operation; and then effecting the operation selected.

In this way, the method of the present invention utilises the processing operation that yields the most accurate and robust measurement in the prevailing circumstances. This is particularly important when the method is used in mobile equipment that tend to encounter conditions which vary considerably with time.

Preferably the method includes a test which comprises determining whether the signal level of the received signal is above a threshold value; if the level of the received signal is below the threshold value, the correlation processing operation is selected. If the level of the received signal is above the threshold value, then there is testing if the leading edge gradient is above a gradient threshold value; if the leading edge gradient is below the gradient threshold, the leading edge processing operation is selected. If the leading edge gradient is above the gradient threshold value, the correlation processing operation is selected.

Preferably, the method comprises repeating the test application and operation steps at predetermined intervals.

Other features of the method are disclosed in the claims.

According to the present invention, there is also provided a computer program product directly loadable into the internal memory of a digital computer, comprising software code portions for performing the method of the present invention when said product is run on a computer.

According to the present invention, there is also provided a computer program directly loadable into the internal memory of a digital computer, comprising software code portions for performing the method of the present invention when said program is run on a computer.

According to the present invention, there is also provided a carrier, which may comprise electronic signals, for a computer program embodying the present invention.

According to the present invention, there is also provided electronic distribution of a computer program product, or a computer program, or a carrier of the present invention.

According to the present invention, there is also provided positioning apparatus for a radio system, the apparatus comprising:

means to receive signals at a unit of the system;

means to apply at least one test on the received signals to select a processing operation on the signals which is one of the following: a correlation processing operation, a leading edge processing operation; and means to effect the operation selected.

The present invention is applicable to time-of-arrival radio systems generally and including GPS or GSM systems, and for example using Ultra Wide Band (UWB) or Direct Sequence Spread Spectrum (DSSS) signals.

Figure 2:
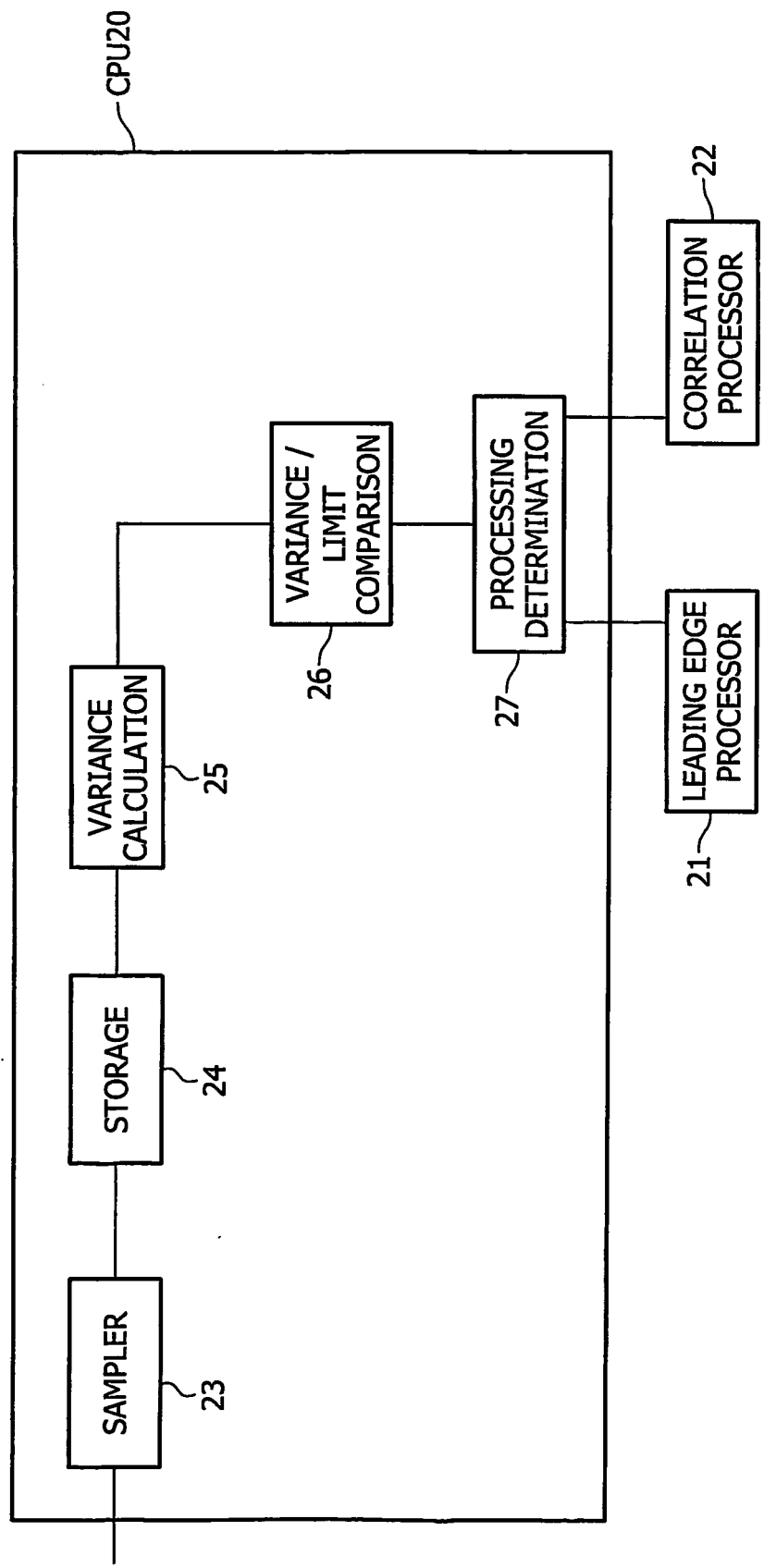

In order that the present invention may more readily be understood, a description is now given, by way of example only, reference being made to the accompanying drawings in which:

FIG. 1 is a flow-chart representing a positioning method provided by the present invention; and FIG. 2 shows a circuit configuration of an implementation of the present invention.

The present invention involves testing signals received at a unit to determine which is the processing operation most appropriate to the signals, being based on a variety of criteria and aspects of the received signals.

Thus, at any given time and set of circumstances, determination may result in a decision to use one particular processing method. At a later time, the form of the signal may have changed and/or the local environment may have changed, resulting in a different decision or even the same decision but for different reasons.

The method represented in FIG. 1, embodying the present invention, allows the time-of-flight of a signal for accurate and robust positioning in e.g. GPS or GSM systems, for example using Ultra Wide Band (UWB) or Direct Sequence Spread Spectrum (DSSS) signals.

Depending on the extent of noise degradation and multipath degradation suffered by the signal in the propagation environment, either a measurement based on a leading edge technique, or a measurement based on a correlation technique, is used in order to yield the most accurate result.

In an environment with a high level of background noise, a measurement based on a standard correlation technique yields a more accurate result, whereas in a densely populated environment with a high level of multipath degradation, a measurement based on a leading-edge technique yields a more accurate result.

The method represented by FIG. 1 provides a reliable and accurate selection of a most appropriate signal processing technique at any given time for a particular set of circumstances.

The method will now be described with reference to FIG. 1.

At Step 1, a receiver B receives a periodic pulse form a transmitter A. In order to obtain a pulse of sufficient Signal/Noise Ratio (SNR) for the point of inflection calculation, each period of the pulse train is coherently summed (Step 2).

For a pulse train with a period of T, coherent summing results in a pulse train constituting N pulse train periods, thereby yielding N times the original signal strength, but only √N times the noise, as coherent summing of pulses causes the noise to be averaged out.

A further way of improving the SNR of the pulses for the purposes of a leading-edge technique is to take the convolution of the first pulse in the pulse train with a bump function, for example a Gaussian function, of width slightly greater than the widest noise perturbation. The nose perturbations are in effect filtered out as the function averages over the width of the noise fluctuation, according to the following equation:

$$\sqrt{\frac{\sigma}{\pi}} \int I^{-\sigma(x-y)^2} f(y),$$

such that the pulse is given by f(y) and the pulse width p satisfies the criterion:

$$p^2 \sigma \gg 1.$$

Step 3 performs a test to determine if the value of the received SNR has a corresponding worst-case leading edge technique range error (found via lookup in the device memory) that is worse than the user-defined range error. The worst-case leading edge range error for various signal-to-noise ratios was taken during previous experimental measurements, this data being stored in the look-up memory.

Step 3 performs a test to determine the worst possible practical range error. The range error is calculated for a received pulse with a very low gradient controlled by measuring signals in the indoor environment to determine the pulse gradient that represents a non-negligible worst-case scenario for a fixed signal-to-noise ratio. The range error is calculated for various predetermined values of SNR, allowing the construction of a look-up table.

In normal operation, the look-up table is used in real time to provide the range error $\epsilon_1$ for a particular SNR with the range error $\epsilon_1$ forming the decision threshold value K, determined firstly by taking plentiful received signal data throughout a particular type of environment e.g. a building. A collection of data (the lower quartile) of lowest gradient signals with the same SNR is chosen as the set of worst-case scenario signals of a given SNR. Then the mean and standard deviation range error is determined for this set of signals with the leading edge method and K is the mean value within the calculated standard deviation. K is dependent on SNR as better SNR increases range error. So for various SNR, the value of K is found from experimental signal measurements.

Once the SNR of the received signal is measured, its corresponding worst-case leading edge range error is looked-up in the memory. This range error is the threshold value K. Previously, the limits of range error of any positioning measurement have been set to be the value e. The value e is checked against the threshold value k. If K<e, Step 4 is reached, so that the error of doing worst-case leading edge is within the user-defined error e, so doing leading edge will give the worst-case error K.

If the SNR is less than the threshold K, Step 11 is reached, wherein the range error using a leading-edge technique is worse than $\epsilon_1$, indicating that the use of a correlation technique is selected.

When K>e, then Step 11 is reached. This means that the error of doing worst-case leading edge is higher than the user-defined error e. The system can only get a smaller range error by doing the correlation technique. As the system has the range error within e, step 11 i.e. the correlation technique must be implemented.

Step 11 comprises another decision point. A test is again performed to determine whether the SNR is too low for a correlation technique with correlation time T, to provide a range error value that is within the user-defined error value found from a look-up table which contains the average range error from a correlation technique for the signal of various SNR and various correlation times. The threshold range error is found from another look-up table for the correlation technique range errors for various times and SNR's. Again a look-up table based on existing data is constructed, with fields SNR, correlation range error. The average range error is found by performing a correlation technique on signals of fixed SNR and correlation time. The range of a received signal is determined via the correlation technique. The exact range is also measured between the transmitter and the receiver. The difference between the correlation estimated range and the exact range is the value of the range error for a particular SNR and correlation time. These measurements are performed many times for a transmitter and receiver placed in differing positions within the environment. The range error value used is the average of those values taken for a fixed SNR and correlation time T, and thereby is utilised to extract a range error $\epsilon_2$, given a particular value of SNR and correlation time T.

The correlation range error for a given time and SNR is found from the look-up table to be C, which is a threshold value. If the user-defined range error e is greater than C than the correlation time for the transmitted signal should be sufficient to obtain a range measurement within the user defined bounds. So the correlation technique is performed in Step 12.

If the threshold error C (found from the look-up table) is greater than the user-defined range error e, then the correlation technique probably gives a position measurement outside the user-defined bounds. Thus, to increase the accuracy of the position measurement is to increase the correlation time, as it increases the SNR of the correlation function used for finding the time-of-flight and subsequently the position fix. This is performed in Step 13.

If the range error $\epsilon_2$ is greater than the range error $\epsilon_1$, a new correlation time T is found from the look-up table that yields an error of at least $\epsilon_1$ for a given SNR.

Should Step 4 be reached, meaning the worst-case leading edge range error for the SNR of the received signal (found from a look-up table) is less than the user-defined or system-defined range error e, Step 5 is carried out only where a power-saving mode is selected in the system.

Step 5 is a power-saving mode to Step 2. Using the stored value for the measured SNR of the received signal, go to look-up table to find the transmit time that yields the max range error e. For the next transmitted signal, the transmit time is reduced to that found in the look-up table.

The high value of SNR is not necessary because as range accuracy is reduced in order to save power. By transmitting a signal for a shorter time the coherently superpose signal has a lower SNR which reduces the range accuracy or increase the range error. However, transmitting a signal for a shorter time saves on signal power.

Step 6 is reached directly from step 4 when no power-saving mode is selected.

At Step 6, a back-up test is conducted to determine whether a leading-edge technique or correlation technique should be used.

The gradient of the leading edge g and the signal-to-noise ratio SNR are stored with the leading edge range error. Also, SNR of the signal and its transmit time T are stored with the average correlation method range error. At Step 7, a correlation method is chosen if, given the SNR and T of the signal, the range error j is less than the range error from the leading edge method given the gradient g and SNR of the signal.

At Step 8, a leading edge method is chosen if, from the look-up table, it is determined that the range error for the leading edge parameter (i.e. SNR and gradient g) is less than the range error from the correlation technique parameters (i.e. SNR and transmit time).

At Step 6, to determine the gradient of the leading edge, a single pulse in the pulse train is used, for example the first one, and the position of the point of inflection of the leading edge is determined. As a digital waveform is unlikely to have sufficient sample points to determine the location of the point of inflection, an analogue signal is preferably used, with the gradient determined using the equation:

$$i = C\frac{dV}{dt},$$

where V is the voltage of the signal waveform C is the capacitance and i is the current.

A range error is the difference between the measured range or time-of-flight of the received signal and the exact known distance the signal travelled (which appears in the look-up table data found in an experimental phase). If the SNR is sufficiently high to have a range error which is less than the user-define error e independent of the pulse gradient, or if the SNR is greater than a predetermined threshold X a leading-edge technique can be employed. This is shown by the flow chart moving directly from step 4 to step 10. This is possible due to the independence of the leading-edge technique from the environment.

From experimental measurements in a building, a SNR value can be found that is so high that say 95 percent of all leading edge measurements have a range error less than the system defined error e.

If SNR is very high, there is little noise on the signal. There is also the multipath effect which affects leading edge techniques much less than correlation techniques. As SNR increases, the multipath the range error decreases. If SNR is high enough, the range error is smaller than the user-defined error e for any multipath environment.

The present invention may provide significant advantages over the prior art in terms of the amount of processing required. If environment thresholds in the present invention are met, the correlation technique can immediately be used, obviating the need for the extra processing required by the leading-edge technique.

Similarly, in some circumstances, an immediate decision to use the lead-edge technique can be made, avoiding the processing associated with finding the correlation peak.

There arise a situation where the thresholds set for utilising either the leading-edge technique or the correlation technique prove not to be sufficiently robust, due to ambiguity in the propagation environment, and the use of a back-up decision is necessary. In the case where only the correlation technique is used, the integration-time of the system can be increased. In the case where only the leading-edge technique is used, a further test on the gradient of the leading edge allows a decision to be made as to whether a leading-edge technique or a correlation technique would provide a more accurate measurement.

FIG. 2 shows a software implementation of the present invention incorporating the method as described in relation to FIG. 1.

Thus there is shown a CPU 20 which accomplishes a number of software routines on input signals in order to determine, for a signal received at CPU 20, whether it is to be processed by a leading-edge unit 21 or a correlation unit 22.

CPU 20 has software to test for low S/N by calculating the gradient of the signal between successive sample points. This is achieved by reference to the sampling rate of the signal which is set to a sampling space of dt by sampler 23. The value of the energy at each sample point is stored in memory 24, i.e. at sample point $t_1$ the signal $e_1$ is stored in memory, at sample point $t_2$ the signal energy $e_2$ is stored and so on.

Once all the appropriate values are stored in memory, the successive gradients are calculated by:

$$E=\{Grad1=(e_2-e)/dt, Grad2=(e_3-e_2)/dt \ldots, Gradn=e_{n+1}-e_n)/dt\}.$$

If the variance of the successive gradients is high, then the S/N level is low because a noisy signal does not have a smooth edge, i.e the edge will be perturbed; so the value of successive gradients differ greatly i.e the variance is high.

In order to calculate the variance of the gradient values in the set E, the following operation 25 is performed:

$$\text{Variance}=1/N\ \text{sum}\_n(\text{Grad}n)^2-(1/N\ \text{sum}\_n\ \text{Grad}n)^2,$$

where N is the total number of sample points, and sum_n is a summation over all the sample points.

By testing over a standard or test sequence of signals prior to production of an implementation of a commercial product embodying the present invention, one can determine the variance value that corresponds to the limit value for doing leading-edge processing.

Leading-edge processing is done on a signal element if the S/N ratio is not too low, otherwise standard correlation is performed (26, 27).

Clearly, in a variant, the operations performed by units 21 and 23 can also be performed by CPU 20 as part of its software routines.

The present invention thereby provides a robust decision-making process, adaptive to variations in the environment, for selecting the most appropriate technique, in real time, for particular circumstances. The decision-making process is supported by the use of coherent pulse summing and convolution with a Gaussian function for improving the signal-to-noise ratio.

The invention claimed is:

1. A positioning method for a radio system, the method comprising:
   receiving signals at a unit of the system;
   applying at least one test on the received signals prior to processing the signals;
   wherein applying the test comprises determining whether a signal level of the received signal is above a threshold value;
   in accordance with the applied test, selecting one of: a correlation processing operation and a leading edge processing operation; and
   performing the selected one of the correlation processing operation and the leading edge processing operation,
   wherein applying the test further includes:
   in response to the level of the received signal being below the threshold value, selecting the correlation processing operation.

2. A positioning method for a radio system, the method comprising:
   receiving signals at a unit of the system;
   applying at least one test on the received signals to select a processing operation on the signals, the operation being one of the following: a correlation processing operation and a leading edge processing operation;
   wherein the applied test comprises:
   determining whether a signal level of the received signal is above a threshold value;
   when the level of the received signal is below the threshold value, selecting the correlation processing operation;
   when a leading edge gradient is below a gradient threshold value, selecting the leading edge processing operation; and
   effecting the selected operation.

3. A positioning method for a radio system, the method comprising:
   receiving signals at a unit of the system;
   applying at least one test on the received signals prior to processing the signals;
   wherein applying the test comprises determining whether a signal level of the received signal is above a threshold value;

in accordance with the applied test, selecting one of: a correlation processing operation and a leading edge processing operation; and performing the selected one of the correlation processing operation and the leading edge processing operation. The method of claim 2, wherein applying the test further includes:

when the level of the received signal is above the threshold value, testing whether a leading edge gradient is above a gradient threshold value' wherein applying the test further includes:

in response to the leading edge gradient being above the gradient threshold value, selecting the correlation processing operation.

4. A positioning method for a radio system, the method comprising:

receiving signals at a unit of the system;

applying at least one test on the received signals prior to processing the signals to select a processing operation on the signals, the operation being one of the following: a correlation processing operation, and a leading edge processing operation;

then effecting the selected operation; and measuring a gradient using the formula:

$$i=Cdv/Dt$$

Where,

V=voltage of a signal waveform,

C=capacitance, i=current, and t=time.

5. A positioning apparatus for a radio system, the apparatus comprising:

a receiver which receives radio frequency signals which have potentially suffered at least one of noise degradation and multi-path degradation in a propagation environment;

testing means for testing the received radio frequency signals, which have not been subject to a correlation processing operation, for at least noise degradation and multi-path degradation and selecting one of:

a correlation processing operation and a leading edge processing operation based on the testing; and a processor which subsequently processes the tested radiofrequency signals with the selected one of the correlation based processing operation and the leading edge processing operation.

6. The apparatus of claim 5, wherein the testing means includes:

means to determine whether a signal level of the received radio frequency signal is above a threshold value.

7. The apparatus of claim 6, wherein the testing means includes:

means which selects the correlation processing operation in response to the signal level of the received signal being below the level threshold value.

8. The apparatus of claim 7, wherein the testing means includes:

means to test signals with signal level above the level threshold value to determine whether the signal has a leading edge gradient above a gradient threshold value.

9. The apparatus of claim 8, wherein the testing means includes:

means which selects:

the leading edge processing operation in response to the leading edge gradient being below the gradient threshold value, and the correlation processing operation in response to the leading edge gradient being above the gradient threshold value.

10. The apparatus of claim 5, wherein the testing means includes:

means to cause the testing means to repeat the testing at predetermined intervals.

11. A positioning method for a radio system, the method comprising:

receiving signals at a unit of the system;

applying at least one test on the received signals prior to processing the signals to select between a correlation processing operation and a leading edge processing operation, the test including:

determining whether a signal level of the received signal is above a threshold value;

in response to the level of the received signal being below the threshold value, selecting the correlation processing operation;

when the level of the received signal is above the threshold value, testing whether a leading edge gradient value is above a gradient threshold value;

in response to the leading edge gradient value being below the gradient threshold value, selecting the leading edge processing operation; and in response to the leading edge gradient value being above the gradient threshold value, selecting the correlation processing operation.

* * * * *